United States Patent
Park et al.

(10) Patent No.: US 11,336,121 B2
(45) Date of Patent: May 17, 2022

(54) ELECTRONIC DEVICE FOR RECEIVING WIRELESS POWER, AND OPERATING METHOD OF ELECTRONIC DEVICE

(71) Applicant: Samsung Electronics Co., Ltd., Gyeonggi-do (KR)

(72) Inventors: Seho Park, Gyeonggi-do (KR); Yusu Kim, Gyeonggi-do (KR); Juhyang Lee, Gyeonggi-do (KR); Yongsang Yun, Gyeonggi-do (KR); Chihyun Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/756,774

(22) PCT Filed: Aug. 16, 2018

(86) PCT No.: PCT/KR2018/009401
§ 371 (c)(1),
(2) Date: Apr. 16, 2020

(87) PCT Pub. No.: WO2019/088416
PCT Pub. Date: May 9, 2019

(65) Prior Publication Data
US 2021/0194285 A1 Jun. 24, 2021

(30) Foreign Application Priority Data
Oct. 31, 2017 (KR) .................. 10-2017-0144288

(51) Int. Cl.
*H02J 50/12* (2016.01)
*H02J 50/80* (2016.01)
*H02J 50/00* (2016.01)

(52) U.S. Cl.
CPC ............ *H02J 50/12* (2016.02); *H02J 50/005* (2020.01); *H02J 50/80* (2016.02)

(58) Field of Classification Search
CPC ............ H02J 50/12; H02J 50/80; H02J 50/00
See application file for complete search history.

(56) References Cited

U.S. PATENT DOCUMENTS 6,321,067 B1 11/2001 Suga et al.
6,750,560 B1 6/2004 Nishimoto et al.
(Continued)

FOREIGN PATENT DOCUMENTS

CN 102971934 3/2013
KR 1020130087976 8/2013
(Continued)

OTHER PUBLICATIONS

PCT/ISA/210 Search Report dated Dec. 6, 2018 issued on PCT/KR2018/009401, pp. 5.
(Continued)

*Primary Examiner* — Toan T Vu
*Assistant Examiner* — Joseph N Inge
(74) *Attorney, Agent, or Firm* — The Farrell Law Firm, P.C.

(57) ABSTRACT

Provided in various embodiments are an electronic device for receiving wireless power and an operating method of the electronic device, the electronic device comprising: a power receiving circuit including a wireless coil for receiving power from an external electronic device and a rectifying circuit for converting, into a direct current signal, an electric signal received from the external electronic device; a sensing circuit for determining a state of the electronic device by checking a signal applied to the wireless power receiving circuit by means of the external electronic device; and a processor, wherein the processor can be set so as to receive an output signal of the sensing circuit and control, on the basis of the output signal, a gate voltage of at least one field effect transistor (FET) element connected to an input termi-
(Continued)

nal of the rectifying circuit. Other various embodiments are possible.

11 Claims, 13 Drawing Sheets

(56) References Cited

U.S. PATENT DOCUMENTS

| | | | |
|---|---|---|---|
| 8,374,545 B2* | 2/2013 | Menegoli | H04B 5/0037 455/41.1 |
| 2009/0195360 A1 | 8/2009 | Jeon et al. | |
| 2011/0053500 A1 | 3/2011 | Menegoli et al. | |
| 2013/0043833 A1 | 2/2013 | Katz et al. | |
| 2014/0028108 A1* | 1/2014 | Hsu | H01F 38/14 307/104 |
| 2014/0028244 A1* | 1/2014 | Korekoda | B60L 53/122 320/106 |
| 2016/0268815 A1 | 9/2016 | Lee et al. | |
| 2017/0201127 A1* | 7/2017 | Jung | H02J 7/04 |
| 2017/0295564 A1 | 10/2017 | Tiirola et al. | |
| 2017/0295567 A1 | 10/2017 | Chen et al. | |
| 2018/0301943 A1 | 10/2018 | Uchimoto | |

FOREIGN PATENT DOCUMENTS

| | | |
|---|---|---|
| KR | 1020160109955 | 9/2016 |
| KR | 1020170007756 | 1/2017 |
| WO | WO2017110369 | 6/2017 |

OTHER PUBLICATIONS

PCT/ISA/237 Written Opinion dated Dec. 6, 2018 issued on PCT/KR2018/009401 pp. 6.
European Search Report dated Aug. 11, 2020 issued in counterpart application No. 18874949.3-1202, 8 pages.
European Search Report dated Dec. 2, 2021 issued in counterpart application No. 18874949.3-1202, 5 pages.

* cited by examiner

ELECTRONIC DEVICE FOR RECEIVING WIRELESS POWER, AND OPERATING METHOD OF ELECTRONIC DEVICE

PRIORITY

This application is a National Phase Entry of PCT International Application No. PCT/KR2018/009401 which was filed on Aug. 16, 2018, and claims priority to Korean Patent Application No. 10-2017-0144288, which was filed on Oct. 31, 2017, the content of each of which is incorporated herein by reference.

BACKGROUND

1. Field

Various embodiments of the disclosure relate to an electronic device for receiving wireless power and a method for operating the same.

2. Related Art

Various electronic devices, such as smart phones, tablet PCs, portable multimedia players (PMP), personal digital assistants (PDA), laptop personal computers, and wearable devices, are supplied.

Such an electronic device may include a separate battery to supply power required to perform various functions. The electronic device may include separate terminals and may be connected to the power supply device via a wire in order to charge the battery.

Recent electronic devices may be capable of supporting wireless charging. The latest electronic devices may have a battery that can be charged using wireless charging. Such wireless charging may support the charging of a battery through close contact, such as by placing the electronic device on a charging pad and the like, without a wired connection through a separate charging connector.

Wireless power transmission described in the disclosure is performed by a scheme of transmitting power by combining magnetic fields between a primary coil of a power-transmitting device and a secondary coil of a power-receiving device. The device for receiving power may modulate a load to generate a predetermined signal, and the device for transmitting power may demodulate the signal to implement communication from the power-receiving device to the power-transmitting device. The load modulation scheme changes a resistance or reactance of a load included in an electronic device, that is, an impedance value in a view toward a power supply device, to increase or decrease the output of the power supply device, and thus generates a predetermined modulation signal.

In the case in which a modulated signal is not included within a specific range (for example, in the case in which a modulated signal has a magnitude exceeding a specific range or less than the specific range), problems such as reduced efficiency of wireless charging may occur in the power-receiving device.

Therefore, a control circuit and an algorithm for measuring the load-modulated signal strength and adjusting the strength of the load-modulated signal are required in order to perform constant adjustment so as to maintain an optimal load-modulated signal strength that satisfies requirements for both capacitor noise and demodulation sensitivity. The disclosure provides a circuit and an algorithm that measure the load-modulated signal strength and effectively adjust the strength of the load-modulated signal.

SUMMARY

An electronic device according to various embodiments of the disclosure may include: a wireless power-receiving circuit including a wireless coil for receiving power from an external electronic device and a rectifying circuit for converting an electrical signal received from the external electronic device into a direct-current signal; a sensing circuit for determining the state of the electronic device by identifying a signal applied to the wireless power-receiving circuit by means of the external electronic device; and a processor. The processor is configured to: receive an output signal of the sensing circuit; and control a gate voltage of at least one field effect transistor (FET) element connected to an input terminal of the rectifying circuit, based on the output signal.

According to various embodiments of the disclosure, a method for operating an electronic device may include: identifying a signal output from a sensing circuit that senses a signal applied to a wireless power-receiving circuit by an external electronic device; and controlling a gate voltage applied to a gate of at least one field effect transistor (FET) element connected to an input terminal of a rectifying circuit that converts the applied signal into a DC signal.

According to various embodiments of the disclosure, an electronic device which receives wireless power and a method for operating the electronic device may be capable of maintaining the magnitude of a modulated signal, input to a rectifying circuit by a resistor implemented by a FET element connected to an input terminal of the rectifying circuit, within a constant range.

According to various embodiments of the disclosure, an electronic device and a method of operating the electronic device for receiving wireless power control the gate power of the FET element connected to the rectifier circuit input terminal to maintain the magnitude of a modulated signal input to the rectifying circuit within a constant range.

DETAILED DESCRIPTION

Figure 1:
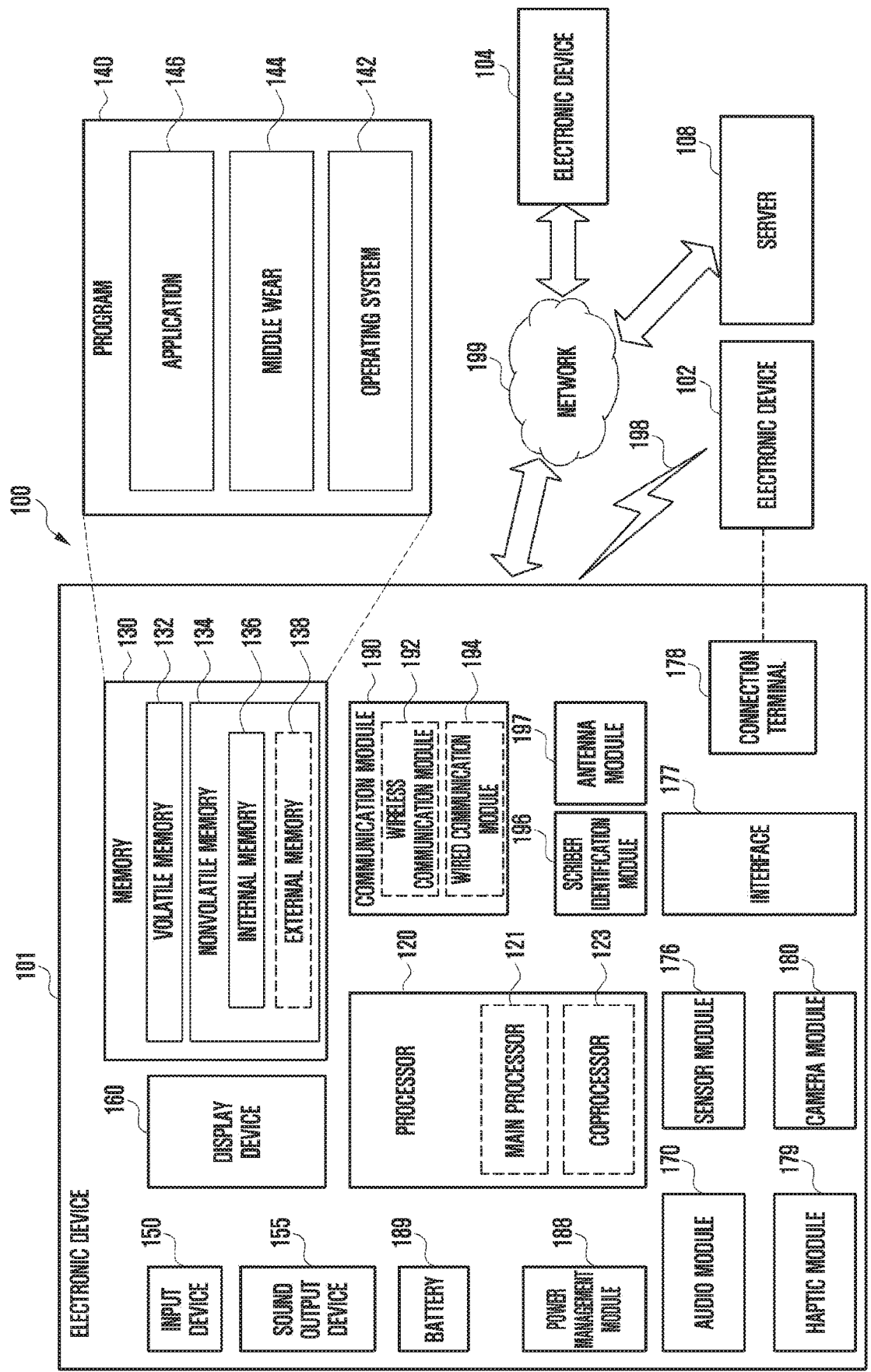
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
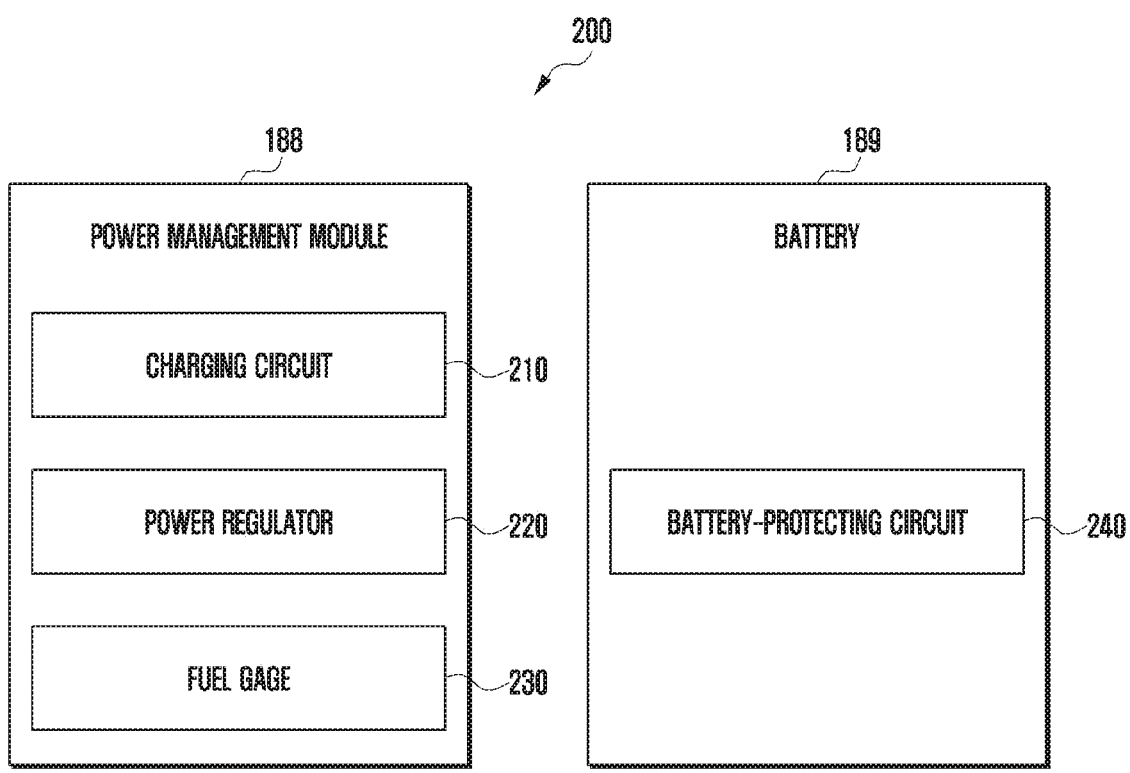
FIG. 2 is a block diagram of a power management module and a battery of an electronic device according to various embodiments of the disclosure.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator.

The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
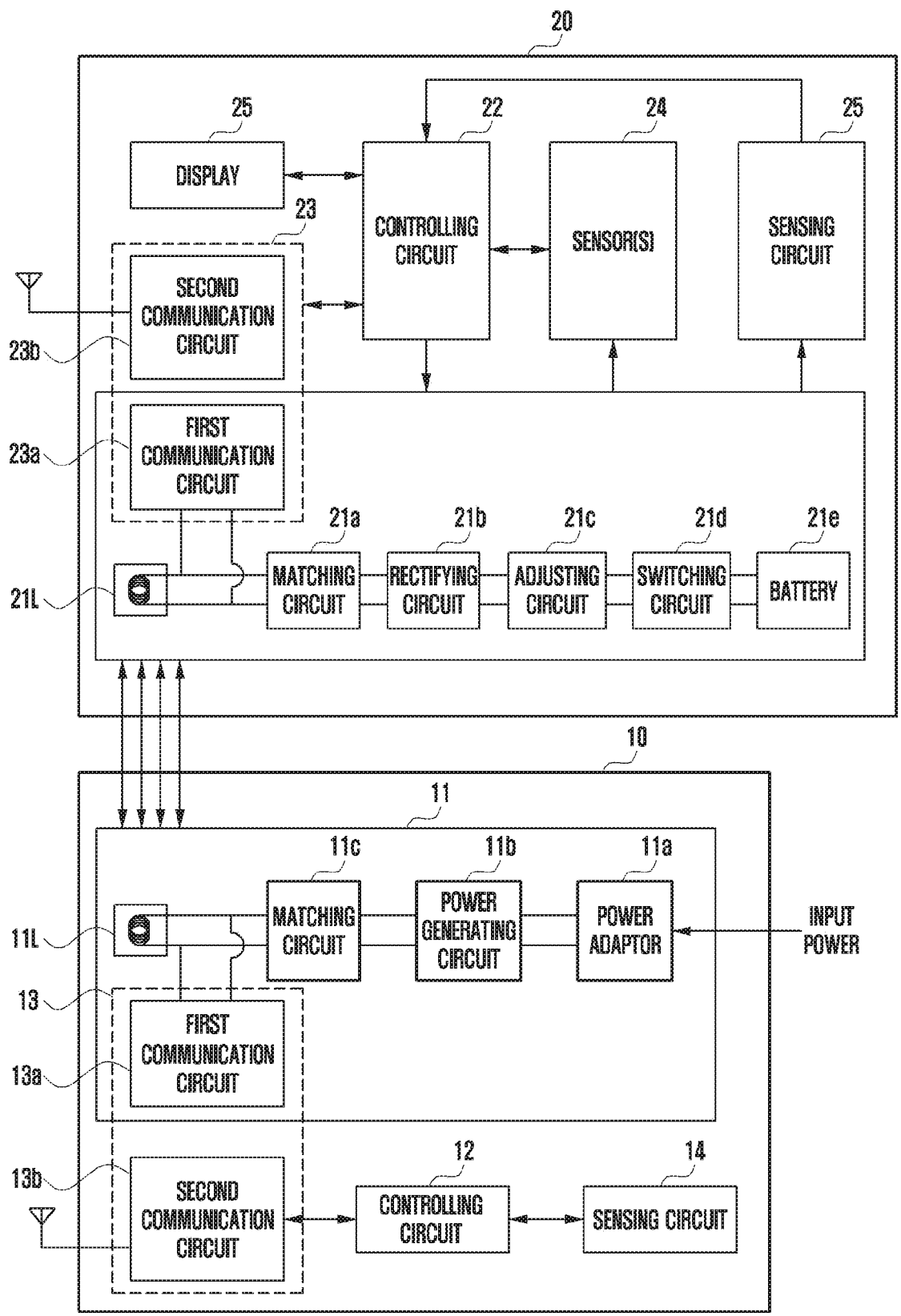
FIG. 3 is a block diagram of an electronic device and a power-transmitting device according to various embodiments of the disclosure.

FIG. 3 is a block diagram of a device which transmits and receives power via wireless power transmission according to various embodiments of the disclosure.

Referring to FIG. 3, in an embodiment, a power-transmitting device 10 may include a power generation unit 11, a control circuit 12, a communication circuit 13, and a sensing circuit 14.

According to various embodiments of the disclosure, the power generation unit 11 may include: a power adaptor 11a which receives power (or electric power) input from the outside and appropriately converts the voltage of the input power; a power generation circuit 11b which generates power; and a matching circuit 11c which increases the transmission efficiency of power transmitted by the power-transmitting device 10 using impedance matching between the power-transmitting device 10 and the electronic device 20.

According to various embodiments of the disclosure, the control circuit 12 may perform overall control of the power-transmitting device 10, generate various messages required for wireless power transmission, and transmit the generated messages to the communication circuit 13. In one embodiment, the control circuit 12 may calculate the power (or amount of power) to be transmitted to the electronic device 20, based on information received from the communication circuit 13. In one embodiment, the control circuit 12 may control the power generation circuit 13 such that the power calculated by a coil 11L is transmitted to the electronic device 20.

According to various embodiments of the disclosure, the communication circuit 13 may include at least one of a first communication circuit 13a and/or a second communication circuit 13b. The first communication circuit 13a may communicate with a first communication circuit 23a of the electronic device 20, for example, using the same frequency band as that used for power transmission in the coil 11L (e.g., an in-band scheme). In one embodiment, the second communication circuit 13b may communicate with a second communication circuit 23b of the electronic device 20, for example, using a frequency different from the frequency used for power transmission in the coil 11L. (e.g., an out-band scheme). For example, the second communication circuit 13b may communicate with the second communication circuit 23b using one of various short-range communication schemes such as Bluetooth, BLE, Wi-Fi, and NFC. According to various embodiments, the communication circuit 13 may obtain information (e.g., Vref information (the magnitude of voltage output from a rectifying circuit (e.g., 21b or 417 of FIG. 4), etc.), Tout information (the magnitude of current output from the rectifying circuit (e.g., 21b or 417 of FIG. 4), etc.), various packets, messages, etc.) related to the charging state through the communication circuit 23 of the electronic device 20.

In addition, the power-transmitting device may further include a sensing circuit 14 for sensing the temperature, movement, orientation, and the like of the power-transmitting device.

According to various embodiments, the electronic device 20 (e.g., the electronic device 101) may include a wireless power-receiving circuit 21 (e.g., a power management module 188), a control circuit 22 (e.g., a processor 120), a communication circuit 23 (e.g., a communication module 190), at least one sensor 24 (e.g., a sensor module 176), and a display 25 (e.g., a display device 160). Some configurations corresponding to the power-transmitting device 10 may be omitted when explaining the electronic device 20.

According to various embodiments of the disclosure, the wireless power-receiving circuit 21 may include: a coil 21L for wirelessly receiving power from the power-transmitting device 10; a matching circuit 21a for increasing the transmission rate of power transmitted by the power-transmitting device 10 using impedance matching between the power transmitting device 10 and the electronic device 20; a rectifying circuit 21b for rectifying the received AC power to DC; an adjustment circuit 21c for adjusting a charging voltage; a switching circuit 21d; and a battery 21e (e.g., battery 189).

According to various embodiments of the disclosure, the control circuit 22 may perform overall control of the electronic device 20, generate various messages required for wireless power transmission and reception, and transmit the generated messages to the communication circuit 23.

According to various embodiments of the disclosure, the communication circuit 23 may include at least one of the first communication circuit 23a and/or the second communication circuit 23b. The first communication circuit 23a may communicate with the power-transmitting device 10 through the coil 21L. The second communication circuit 23b may communicate with the power-transmitting device 10 using one of various short-range communication schemes, such as Bluetooth, BLE, Wi-Fi, and NFC.

In addition, the electronic device 20 may further include: at least one sensor 24, such as a current/voltage sensor, a temperature sensor, an illuminance sensor, and a sound sensor; a display sensing circuit 25; and a sensing circuit 26 for detecting a power transmission device. According to various embodiments, the sensing circuit 26 may sense the power-transmitting device 10 by sensing a discovery signal from the power-transmitting device 203 or power received therefrom. The sensing circuit 26 may generate a signal of the coil 21L a signal output from the power-transmitting device 203. The signal generated in the coil 21L enables the detection of a change in the signal at an input/output terminal of the coil 21L or the matching circuit 21a, or the rectifying circuit 21b. According to various embodiments, the sensing circuit 26 may be included in the receiving circuit 21.

Figure 4:
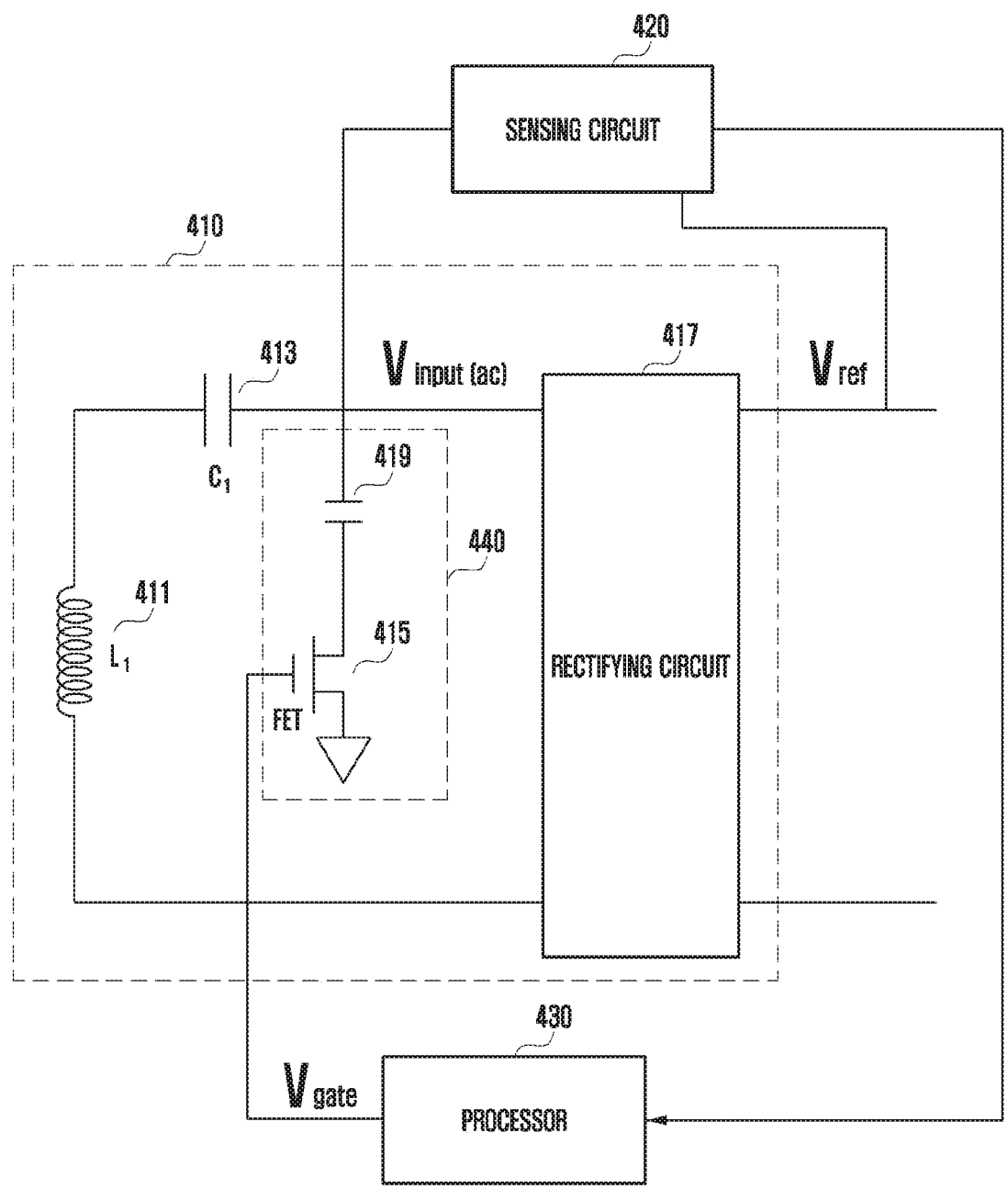
FIG. 4 is a circuit diagram of a power management module of an electronic device according to various embodiments of the disclosure.

FIG. 4 is a circuit diagram of a power management module of an electronic device according to various embodiments of the disclosure.

Referring to FIG. 4, the electronic device 100 according to various embodiments of the disclosure may include a power-receiving circuit (e.g., 410), a sensing circuit (e.g., sensing circuits 26 and 420 of FIG. 3), and a processor (e.g., control circuits 22 and 430 of FIG. 3).

The power-receiving circuit 410 according to various embodiments of the disclosure may include: a coil 411 capable of receiving power from an external electronic device (e.g., the power-transmitting device 10 of FIG. 3); and a rectifying circuit 417 capable of converting an electrical signal received from an external electronic device 10 into a direct-current signal.

According to various embodiments of the disclosure, the power-receiving circuit 410 may receive power from supplied from the external electronic device 10, based on various wireless power transmission/reception schemes, such as a resonance scheme and an electromagnetic induction scheme. The power supplied from the external electronic device 10 may be used to charge a battery included in an electronic device (e.g., the electronic device 100 of FIG. 1). To this end, the power-receiving circuit 410 may include a coil 411 having an inductance for resonance. The coil 411 may be implemented in various forms, for example, in a loop shape.

According to various embodiments of the disclosure, the power-receiving circuit 410 may perform impedance matching in order to realize the maximum power supply efficiency when receiving power from the external electronic device 10. For example, the power-receiving circuit 410 may perform impedance matching, based on an impedance value of the external electronic device 10 in a view from the power-receiving circuit 410. The power-receiving circuit 410 may further include a variable capacitor 413 to perform impedance matching.

According to various embodiments of the disclosure, the power-receiving circuit 410 may change the inductance of the coil 411 and thereby receive a power signal transmitted through another frequency. According to various embodiments of the disclosure, the power-receiving circuit 410 may control various elements included in the power-receiving circuit 410, based on the control of the processor 430.

According to various embodiments of the disclosure, the rectifying circuit 417 included in the power-receiving circuit 410 may convert a signal input to the rectifying circuit 417 into a DC signal. For example, the power signal supplied by the external electronic device 10 may be an AC signal. The rectifying circuit 417 may convert the AC signal input to the rectifying circuit 417 into a DC signal. The rectifying circuit 417 may be implemented using a circuit in which various elements including a diode element are arranged. The sensing circuit 420 may identify a signal applied to the power-receiving circuit 410 by the external electronic device 10. The signal identified by the sensing circuit 420 may be used to determine the state of the electronic device 100. For example, the signal identified by the sensing circuit 420 may include various information including the magnitude and the change of a signal output from the rectifying circuit 417 into which a signal transmitted by the external electronic device has been input, the magnitude of a signal transmitted from the external electronic device 10, and the like.

According to various embodiments of the disclosure, the sensing circuit 420 may be electrically connected to an input terminal of the rectifying circuit 417 or to an output terminal of the rectifying circuit 417. The sensing circuit 420 may identify a signal which has not been rectified yet and is transmitted through the input terminal of the rectifying circuit 417, or may identify a rectified signal through the output terminal of the rectifying circuit 417. For example, the sensing circuit 420 may analyze the waveform of the signal input to or output from the rectifying circuit 417 and identify the magnitude of a voltage (or current) of the signal.

According to various embodiments, the sensing circuit 420 may sense, by a modulation circuit 440 included in the power-receiving circuit 410, a generated modulated signal (a signal generated to demodulate a signal in the external electronic device 10) or a signal change by the modulated signal, in a signal at the input terminal or the output terminal of the rectifying circuit 417.

The change in the signal output from the rectifying circuit 417 may have various causes. For example, a change in the magnitude of a signal output from the rectifying circuit 417 may occur due to noise generated in various components including the rectifying circuit 417, and a change in the magnitude of a signal output from the rectifying circuit 417 may also occur due to load modulation or impedance matching of the impedance of the external electronic device 10 with the impedance of the power-receiving circuit 410.

The processor 430 may identify an output signal output from the sensing circuit 420. According to various embodiments of the disclosure, the processor 430 may identify various information, such as the magnitude of a signal input to the rectifying circuit 417 and the magnitude of a signal output from the rectifying circuit 417, using an output signal output from the sensing circuit 420. The processor 430 may determine whether the magnitude of a signal input to the rectifying circuit 417 falls within a configured range, or whether the magnitude of a signal output from the rectifying circuit 417 falls within a configured range.

According to various embodiments of the disclosure, the magnitude of a signal input to the rectifying circuit may be the strength (magnitude, change amount) of a signal including at least a signal component generated based on the operation of the modulation circuit 440.

According to various embodiments of the disclosure, the power-receiving circuit 410 may include the modulation circuit 440. The modulation circuit 440 may generate a load-modulated signal. The load-modulated signal may include a rectification voltage, current, and other digital information of the power-receiving device.

The modulation circuit 440 may refer to a circuit that performs load modulation on an electrical signal received by the power-receiving circuit 410. The modulation circuit 440 according to various embodiments of the disclosure may include a FET element 415 and a capacitor 419.

According to various embodiments of the disclosure, the load modulation impedance (Zm) in a view toward the power-transmitting device by the modulation circuit 440 may be represented by Equation 1 below, $$Zm = Rm + 1/jwCm, \text{ modulated signal strength} = \Delta Pm \propto 1/Zm \quad \text{[Equation 1]}$$

wherein the modulated signal strength indicates a load-modulated signal strength (ΔPm), Rm indicates the resistance by an FET element, and (1/jwCm) indicates a reactance).

The load-modulated signal strength (ΔPm) may decrease if resistor (Rm) or reactance (1/jwCm) is increased, and the strength may increase if the resistance or reactance is decreased. A load modulation resistor 415 (Rm) may be connected in series with a load modulation capacitor 419 (Cm) and may be connected in parallel (shunt) with a load resistor ($R_L$). The load-modulated signal may refer to a signal that controls the magnitude of the resistance of the FET element 415 and the magnitude of the capacitance of the capacitor 419.

In the case in which the load-modulated signal strength is excessively large, the amount of change in the rectification voltage of the power-receiving device increases. Thus, there may be problems including increased capacitor noise from the rectifying capacitor and decreased voltage smoothness of a battery-charging circuit connected to an output of a rectifying circuit. On the other hand, in the case in which the load-modulated signal strength is excessively small, the power-transmitting device fails to demodulate the signal and thus cannot receive predetermined power control information. Thus, there may be a problem associated with interruption of power transmission for safety of power control.

According to various embodiments of the disclosure, mutual inductance between the coil 11L of the power-transmitting device 10 and the coil 21L of the power-receiving device 20 may change according to an alignment state, a coupling coefficient, the number of coil turns, and the inherent inductance between the coil of the power-transmitting device 10 and the coil of the electronic device 20 (the power-receiving device). In addition, impedance matching may change according to the driving voltage of the power-transmitting device 10 and the rectification voltage of the power-receiving device. The load-modulated signal strength may have various values under various mutual inductance and impedance-matching conditions. The modulation circuit 440 may generate, under various conditions under the control of the processor 430, a load-modulated signal strength having a constant range and satisfying both requirements for both capacitor noise and demodulation sensitivity.

According to various embodiments of the disclosure, the modulation circuit 440 may be controlled by the processor 430, based on an output signal output from the sensing circuit 420.

According to various embodiments of the disclosure, the processor 430 may control the voltage at a gate terminal of at least one field effect transistor (FET) element 415 connected to the input terminal of the rectifying circuit 417, based on an output signal output from the sensing circuit 420.

The FET element 415 may include three terminals including a source, a drain, and a gate, and may refer to various transistor elements that can control the current of the source and the drain, using a principle in which a voltage is applied to generate, by an electric field of a channel, a gateway through which electrons flow. Hereinafter, for ease of explanation, an embodiment of the connection of the FET element 415 will be described under the assumption that the FET element 415 is implemented as an N-FET. However, the scope of the disclosure encompasses the case in which the FET element 415 is implemented as a P-FET. For example, a capacitor connected to a drain terminal of the FET element 415 may be replaced by being connected to a source terminal of an element implemented as a P-FET. According to various embodiments, the FET element may be provided as a BJT.

According to various embodiments of the disclosure, the drain terminal of the FET element 415 may be electrically connected to an input terminal of the rectifying circuit 417. According to various embodiments of the disclosure, the capacitor may be positioned between the FET element 415 and the input terminal of the rectifying circuit 147. The drain terminal of the FET element 415 may be connected to the input terminal of the rectifying circuit 417 through a capacitor 419. According to various embodiments of the disclosure, the capacitor 419 may be a variable capacitor.

According to various embodiments of the disclosure, the source terminal of the FET element 415 may be connected to ground and thus grounded. According to another embodiment, the source terminal of the FET element 415 may be electrically connected to another input terminal of a rectifier.

According to various embodiments of the disclosure, a gate terminal of the FET element 415 may be electrically connected to the processor 430. The magnitude of a voltage applied to the gate terminal may be adjusted under the control of the processor 430. According to various embodiments of the disclosure, the FET element 415 may operate in various regions, such as a linear region and a saturation region. While the FET element 415 operates in the linear region (see FIG. 5B), the processor 430 may perform control to allow the FET element 415 to act as a resistor by controlling the gate voltage of the FET element 415.

According to various embodiments of the disclosure, the processor 430 may identify the magnitude of a signal output from the rectifying circuit 417, based on a signal output from the sensing circuit 417 and may determine whether the magnitude of the output signal of the rectifying circuit 417 is equal to or greater than (or greater than) a configured value. In the case in which the magnitude of the output signal of the rectifying circuit 417 is equal to or greater than (or greater than) the configured value, the processor 430 may control the gate voltage of the FET element 415 such that the magnitude of the output signal of the rectifying circuit 417 becomes smaller than or equal to (or smaller than) the configured value. The gate voltage of 415 can be controlled. By controlling the gate voltage of the FET element 415, the FET element 415 may operate as a resistor having a configured value. The magnitude of the resistance of the FET element 415 may vary according to the gate voltage. That is, the FET element 415 may operate as a variable resistor. According to various embodiments of the disclosure, the processor 430 may identify the magnitude of a signal output from the rectifying circuit 417, based on the waveform of an input signal of the rectifying circuit 417, and may determine whether the magnitude of the signal falls within a configured range. For example, the process 430 may determine whether the changed size of a signal due to the modulated signal falls within a configured range. In the case in which the magnitude of the signal is out of the configured range, the processor 430 may control the gate voltage of the FET element 415 such that the signal can be generated as a signal within a constant range. By controlling the gate voltage of the FET element 415, the FET element 415 may operate as a resistor having a configured value. The magnitude of the resistor of the FET element 415 may vary according to the gate voltage. The FET element 415 may operate as a variable resistor.

According to various embodiments of the disclosure, the processor 430 may determine whether the changed size of a signal due to the modulated signal falls within a configured range. In the case in which the magnitude of the signal is out of the configured range, the processor 430 may variably control the capacitor 419 such that the signal can be generated as a signal within a constant range.

According to various embodiments of the disclosure, the processor 430 may identify the magnitude of a signal input to the rectifying circuit 417 or a signal output from the rectifying circuit 417, based on a signal output from the sensing circuit 417, and may determine whether the magnitude of the signal is equal to or greater than (or greater than) the configured value. In the case in which the magnitude of the signal is equal to or greater than (or greater than) the set value, the processor 430 may control the gate voltage of the FET element 415 such that the magnitude of the signal becomes smaller than or equal to (or smaller than) the configured value. According to various embodiments of the disclosure, the processor 430 may identify the magnitude of a signal input to the rectifying circuit 417 or a signal output from the rectifying circuit 417, based on a signal output from the sensing circuit 417, and may determine whether the magnitude of the signal is smaller than or equal to (or smaller than) the configured value. In the case in which the magnitude of the signal is smaller than or equal to (or smaller than) the configured value, the processor 430 may control the gate voltage of the FET element 415 such that the magnitude of the signal becomes equal to or greater than (or greater than) the configured value.

According to various embodiments, the processor 430 may adjust a signal input to the rectifying circuit 417 using a characteristic of adjusting a current that may flow according to the application of a gate voltage of the FET element 415. According to various embodiments of the disclosure, the processor 430 may adjust a signal input to the rectifying circuit 417 by controlling the gate voltage of the Cap and FET element 415. The processor 430 may adjust the magnitude of an input signal of the sensing circuit 420 using the characteristic of the FET element 415, which is capable of operating as a resistor. For example, the processor 430 may control the gate voltage such that the FET element 415 has a lager resistance value than the FET element 415 previously had, in order to reduce the magnitude of a signal input to the sensing circuit 417.

According to various embodiments of the disclosure, the processor 430 may control the FET element 415, based on a signal output from the sensing circuit 417. In the case in which the FET element 415 is an N-channel MOSFET, if the gate voltage (VGS) applied to a gate is increased, the load-modulated resistance is decreased, and accordingly the load-modulated signal strength may be increased. On the other hand, if the gate voltage is decreased, the load-modulated resistance is increased, and accordingly the load-modulated signal strength may be decreased. According to various embodiments of the disclosure, in the case in which the FET element 415 is a P-channel MOSFET, if the gate voltage (VGS) applied to the gate is increased, the load-modulation resistance is increased, and accordingly the load-modulated signal strength may be decreased. On the other hand, if the gate voltage is decreased, the load-modulated resistance is decreased, and accordingly the load-modulated signal strength may be increased.

According to various embodiments of the disclosure, with regard to the FET element 415, a bipolar junction transistor (BJT) may be implemented in place of the FET element 415. This may be changed as desired by the designer of the modulation circuit 440. In the disclosure, the FET element 415 may be implemented as the BJT. For ease of explanation, a description will be made under the assumption that the FET element 415 is implemented as an FET element.

Details of controlling the operation of the FET element 415 as a resistor will be described with reference to FIG. 5.

The processor 430 may identify the magnitude of a gate voltage using a table in which the range of the magnitude of a signal input to the rectifying circuit 417 and the magnitude of the gate voltage are mapped. For example, the table in which the range of the magnitude of the signal input to the rectifying circuit 417 and the magnitude of the gate voltage are mapped may be stored in a memory (e.g., the memory 130 of FIG. 1) of the electronic device (e.g., the electronic device 100 of FIG. 1). The processor 430 may identify the magnitude of the gate voltage corresponding to the range of the magnitude of the signal input to the identified rectifying circuit 417 after reading the table from the memory 130. The processor 430 may change the gate voltage of the FET element 415 to be equal to the identified gate voltage. According to various embodiments of the disclosure, the magnitude of a signal input to the rectifying circuit 417 may include the strength of a signal (e.g., the magnitude of a signal, the amount of change in a signal) including a signal component generated based on the operation of the modulation circuit 440.

Figure 5A:
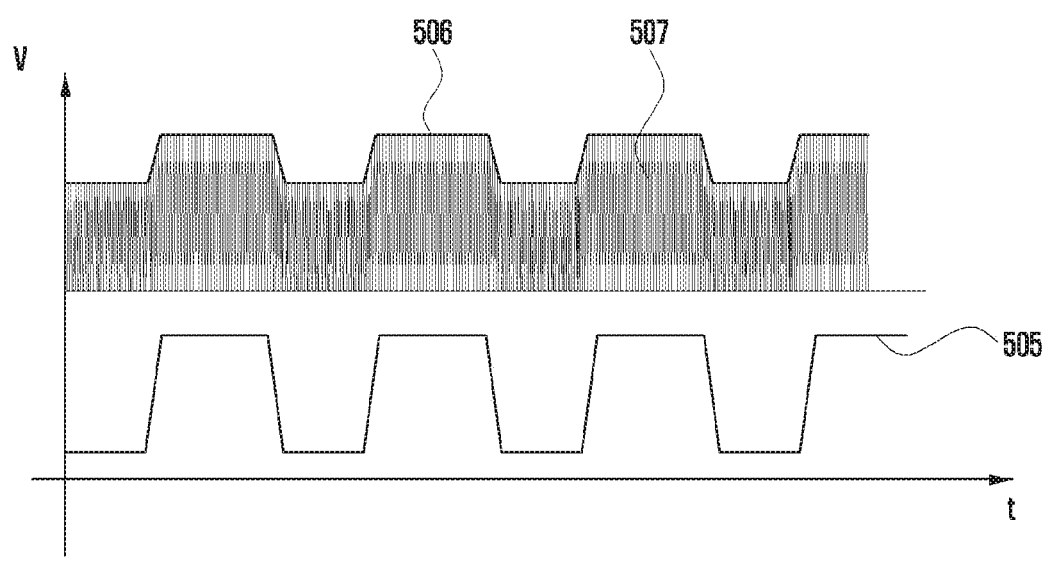
FIG. 5A illustrates a signal input to a rectifying circuit in an electronic device according to various embodiments of the disclosure.

FIG. 5A illustrates a waveform of a signal input to an input terminal of a rectifying circuit and a waveform of a signal output from an output terminal of a rectifying circuit in an electronic device according to various embodiments of the disclosure. FIG. 5A illustrates a waveform 506 of a signal input to the input terminal of the rectifying circuit. Referring to the waveform 506 of the signal, it can be seen that the signal input to the input terminal of the rectifying circuit 417 is irregular at the time of the occurrence of the modulation in the modulation circuit 440. Referring to FIG. 5A, the signal input to the input terminal of the rectifying circuit 417 may have a form, such as a waveform of a trigonometric function or a waveform of a square wave.

The irregularity in the signal input to the input terminal of the rectifying circuit 417 may be generated by a load-modulated signal including a signal for controlling the magnitude of the resistance of the FET element 415 included in the modulation circuit 440 and the magnitude of the capacitance of the capacitor 419.

FIG. 5A illustrates a waveform 505 of a signal input to the output terminal of the rectifying circuit.

Figure 5B:
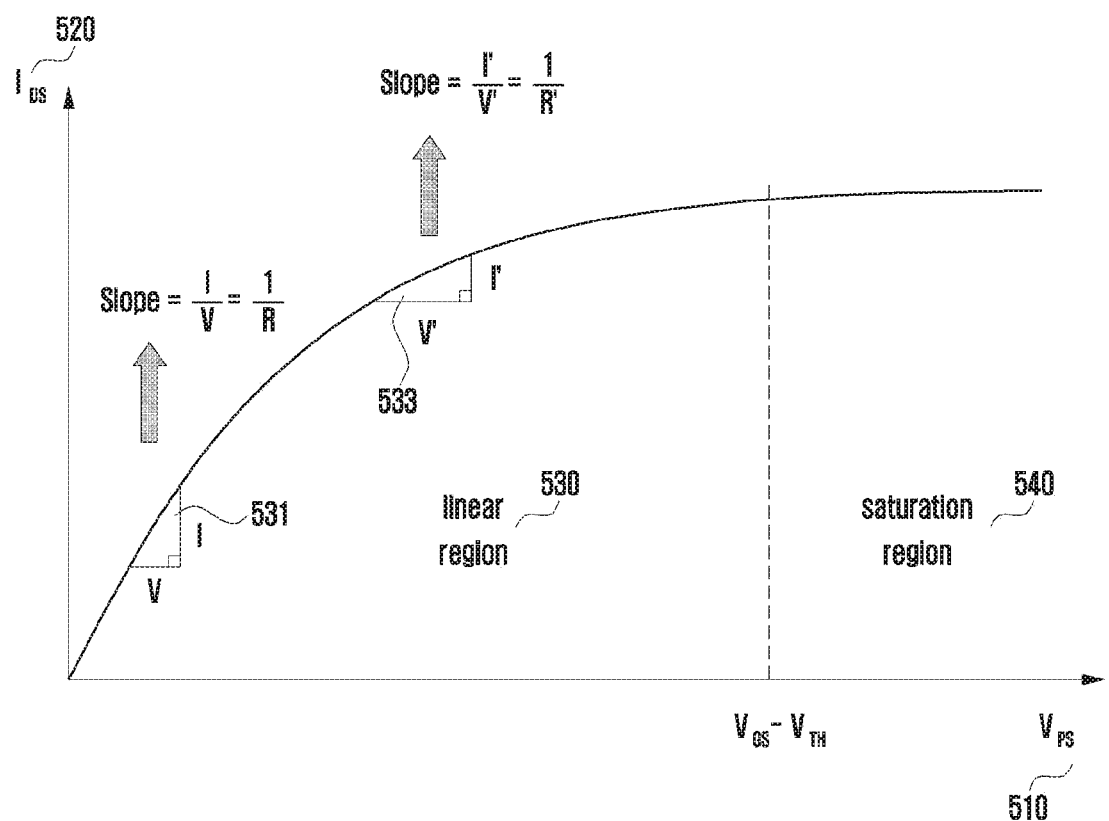
FIG. 5B illustrates characteristics of an FET element in an electronic device according to various embodiments of the disclosure.

FIG. 5B illustrates characteristics of an FET element in an electronic device according to various embodiments of the disclosure.

The operations of the FET element 415 may be performed in three broadly defined regions. The three regions may include: a blocking region in which no current flows between the drain and the source; a linear region that appears to follow Ohm's law, such as a linear resistance element; and a saturation region in which an amplifier can operate. The three regions may be implemented by the difference value between the gate voltage applied to the gate terminal of the FET element 415 and the source voltage applied to the source terminal thereof.

FIG. 5B illustrates the characteristics of current according to the voltage difference between the drain element and the source terminal of the FET element (e.g., the FET element 415 of FIG. 4). For ease of explanation, it is assumed that the source terminal of the FET element 415 is connected to ground.

If the voltages (Vds) 510 applied to the drain terminal of the FET element 415 are greater than the difference between the magnitude (Vgs) of the voltage applied to the gate terminal and the threshold voltage (Vth), the FET element 415 may operate in the saturated region 540.

If the voltage (Vds) applied to the drain terminal of the FET element 415 is smaller than the difference between the magnitude (Vgs) of the voltage applied to the gate terminal and the threshold voltage (Vth), the FET element 415 may operate in the linear region 530. According to various embodiments of the disclosure, the processor 430 may adjust the voltage applied to the drain terminal so that the FET element 415 operates in the linear region.

Referring to FIG. 5B, in the case in which the FET element 415 operates in the linear region 530, the magnitude 520 of the flowing current varies according to the magnitude 510 of the voltage, and a slope indicating the relationship between the voltage 510 and the current 520 changes. Furthermore, the slope may show that the current is inversely proportional to the magnitude of the voltage applied to the gate terminal. The magnitude of resistance that the FET element 415 may have is described in Equation 2 below, $$r_{DS} = \frac{1}{g_{DS}} = \frac{1}{(\mu_n C_{ox})\left(\frac{W}{L}\right)(V_{GS} - V_{th})} \quad \text{[Equation 2]}$$

wherein Rds indicates a magnitude of resistance, μn indicates an electron mobility, Cox indicates an oxide capacitance, Vgs indicates a difference between a gate voltage and a source voltage, and Vth indicates a threshold voltage.

Referring to Equation 2, the magnitude of the gate voltage (the source voltage is assumed to be 0 due to the connection to ground) is inversely proportional to the magnitude of the resistance. According to various embodiments of the disclosure, the processor 430 may adjust the magnitude of the resistance of the FET element 415 by controlling the gate voltage. Further, the processor 430 may control the load modulation by adjusting the magnitude of the resistance of the FET element 415.

A description of FIG. 5B is given under the assumption that the FET element 415 is implemented as an N-Channel MOSFET. However, the FET element 415 may be implemented as a P-Channel MOSFET, or may be implemented as a BJT.

Figure 6A:
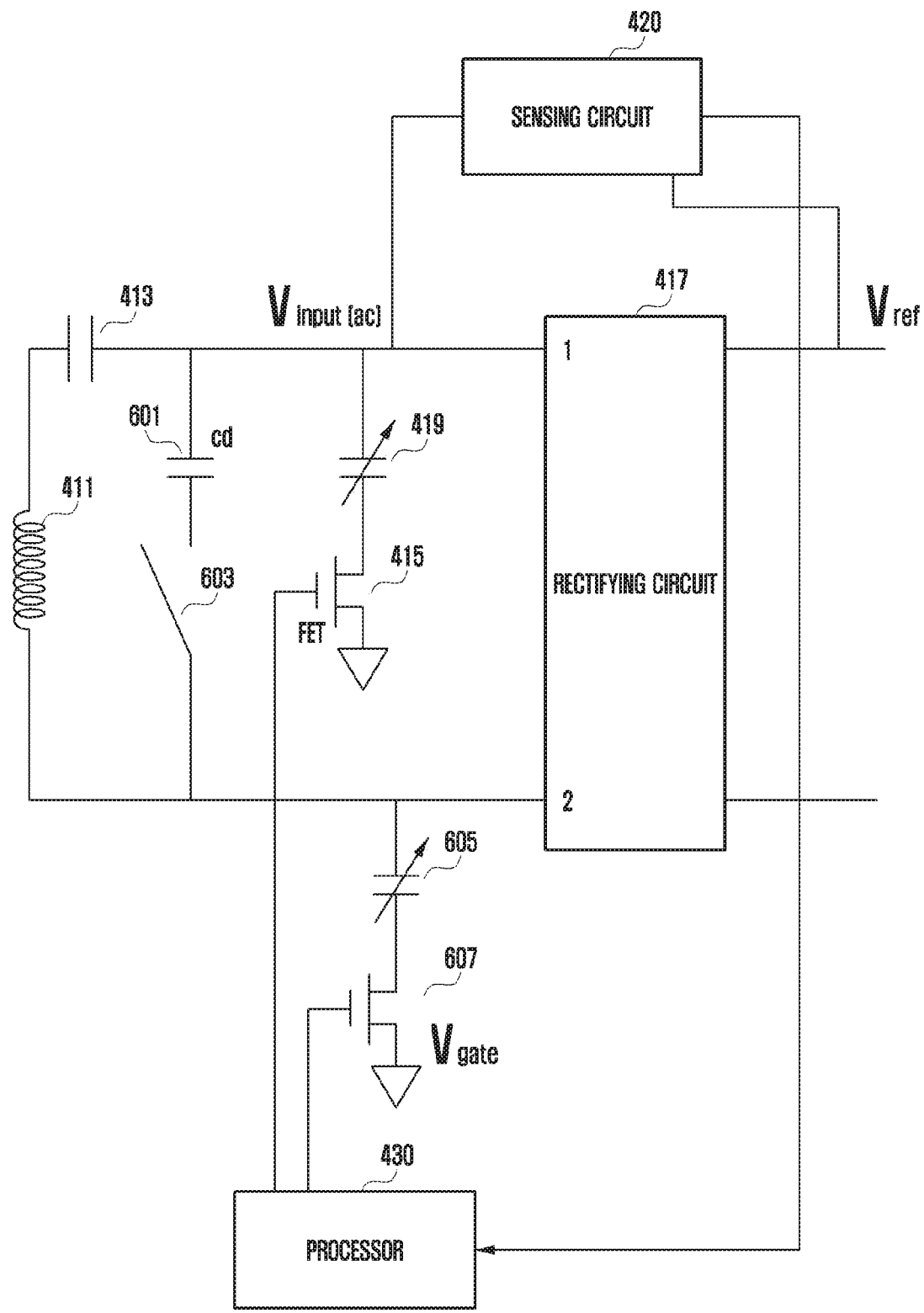
FIGS. 6A and 6B illustrate circuit diagrams of an electronic device according to various embodiments of the disclosure.
Figure 6B:
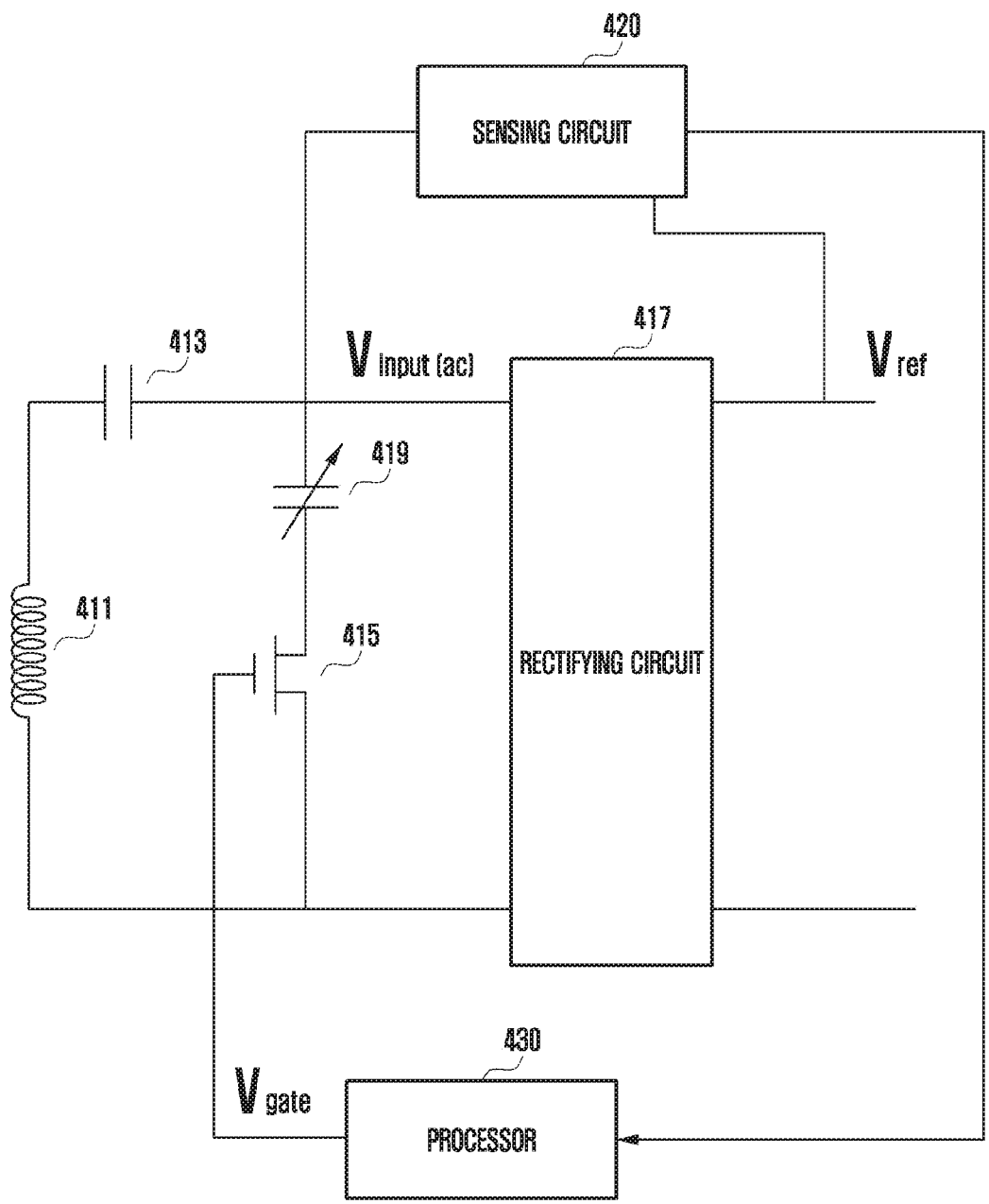

FIGS. 6A and 6B illustrate an electronic device according to various embodiments of the disclosure.

Referring to FIG. 6A, the FET element (e.g., the FET element 415 of FIG. 4) connected to the input terminal of the rectifying circuit 417 may be connected in series with the capacitor 419. The capacitor 419 may be used for load modulation. For example, the capacitor 419 may be used to perform impedance matching with an impedance of an external electronic device (e.g., the power supply device 10 of FIG. 3) in a view from the power-receiving circuit (e.g., the power-receiving circuit 410 of FIG. 4). The source terminal of the FET element 415 (the case in which the FET element 415 is implemented as an N-FET), or the drain terminal (the case in which the FET element 415 is implemented as a P-FET) may be grounded.

According to various embodiments of the disclosure, the power-receiving circuit (e.g., the power-receiving circuit 410 of FIG. 4) may further include the FET element 415, the capacitor 419 connected in series with the FET element 415, and a capacitor (Cd) 601 connected in parallel with the FET element 415. The capacitor 601 may be used for load modulation. Furthermore, the capacitor 601 and a variable capacitor 419 may be used for load modulation together, based on control of a switch 603 of the processor (e.g., the processor 430 of FIG. 4).

According to various embodiments of the disclosure, the switch 603 may be implemented by a FET element. For example, the role of the switch 603 may be implemented by the FET element by causing the FET element to operate in the blocking region, or to operate in the saturation region or the linear region, based on the control of the processor 430.

According to various embodiments of the disclosure, the power-receiving circuit 410 may further include a FET element 607 connected to another input terminal (2) of the rectifying circuit, and a capacitor 605 connected in series with the FET element 607. The FET element 607 may serve as a resistor, based on the control of the gate voltage of the processor 430, in the same manner as the FET element 415. The gate voltage of the FET element 607 may be electrically connected to the processor 430. The capacitor 605 may be used for load modulation.

Referring to FIG. 6B, the FET element 415 connected to the input terminal of the rectifying circuit 417 may be connected in series with the variable capacitor 419. The variable capacitor 419 may be used for load modulation. For example, the capacitor 620 may be used to perform impedance matching with an impedance of an external electronic device (e.g., the power supply device 10 of FIG. 3) in a view from the power-receiving circuit (e.g., the power-receiving circuit 410 of FIG. 4). According to various embodiments of the disclosure, the processor (e.g., the processor 430 of FIG. 4) may control the capacitance of the variable capacitor 620, based on a signal output from the sensing circuit 420. Therefore, impedance matching may be carried out and power transmission efficiency may be increased.

According to various embodiments of the disclosure, the source terminal (in the case in which the FET element 415 is implemented as an N-FET) or the drain terminal (in the case in which the FET element 415 is implemented as a P-FET) of the FET element 415 may be connected to another input terminal of the rectifying circuit.

Figure 7A:
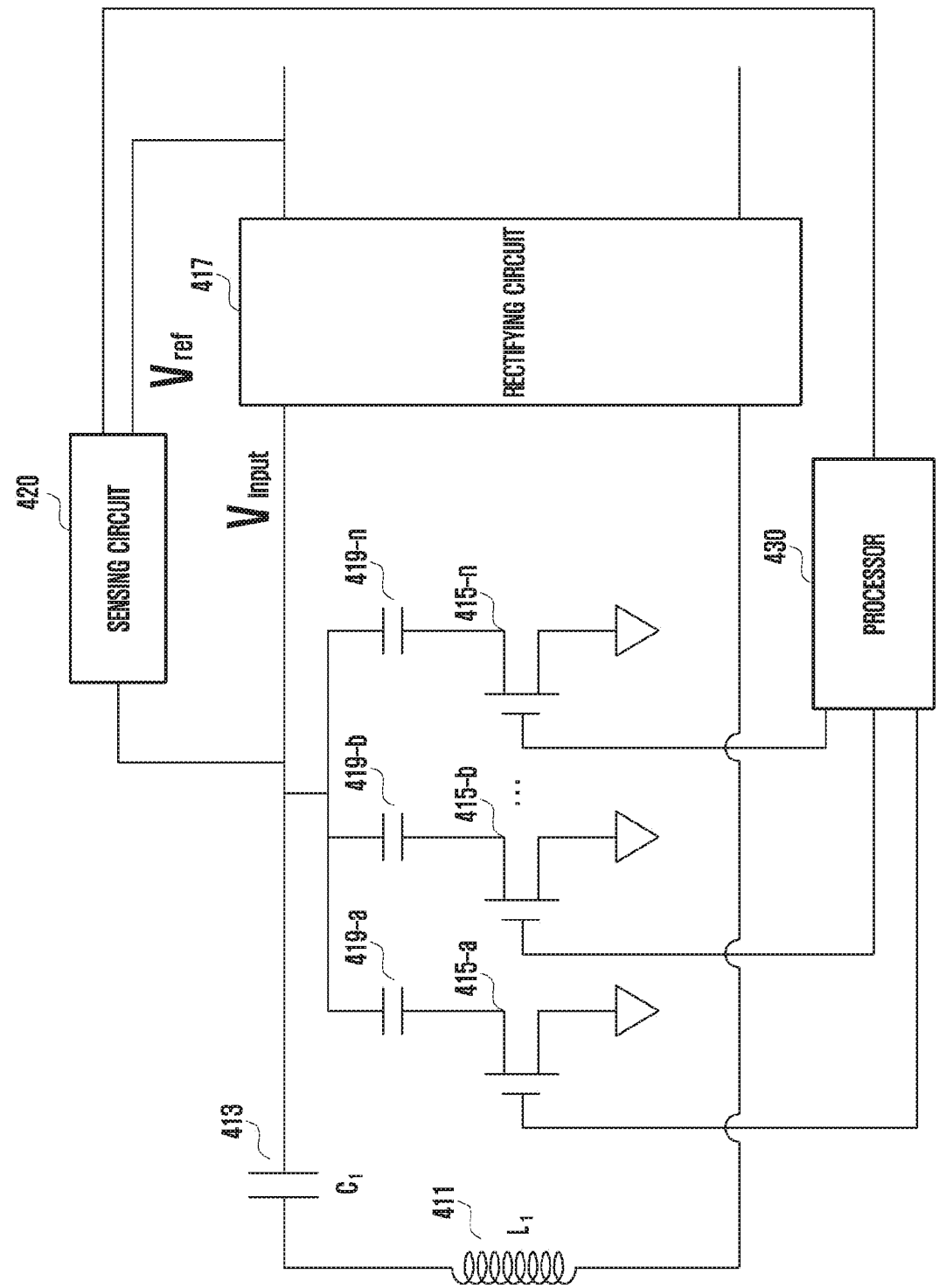
FIGS. 7A to 7C illustrate arrangement of a plurality of FET elements in an electronic device according to various embodiments of the disclosure
Figure 7B:
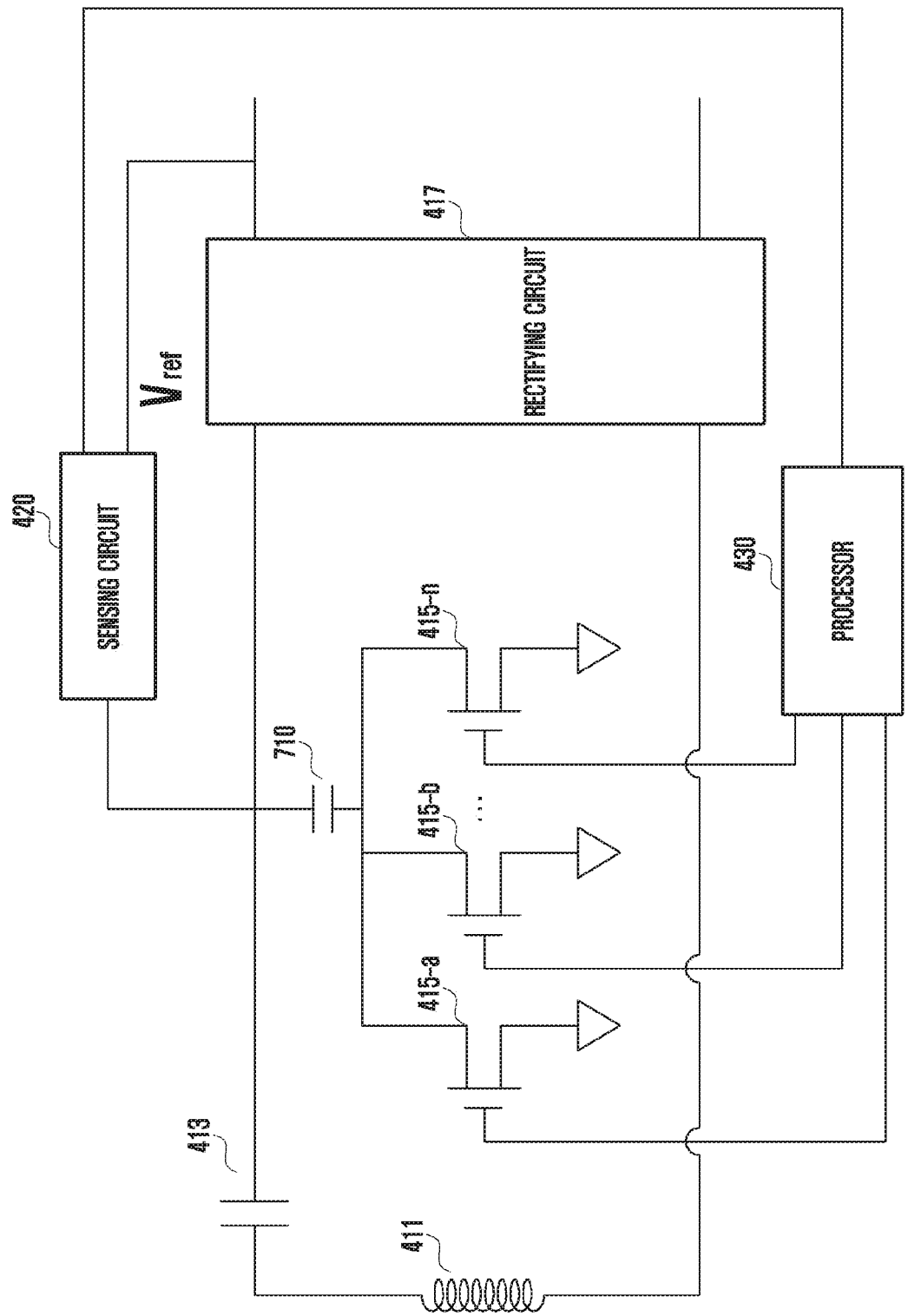
Figure 7C:
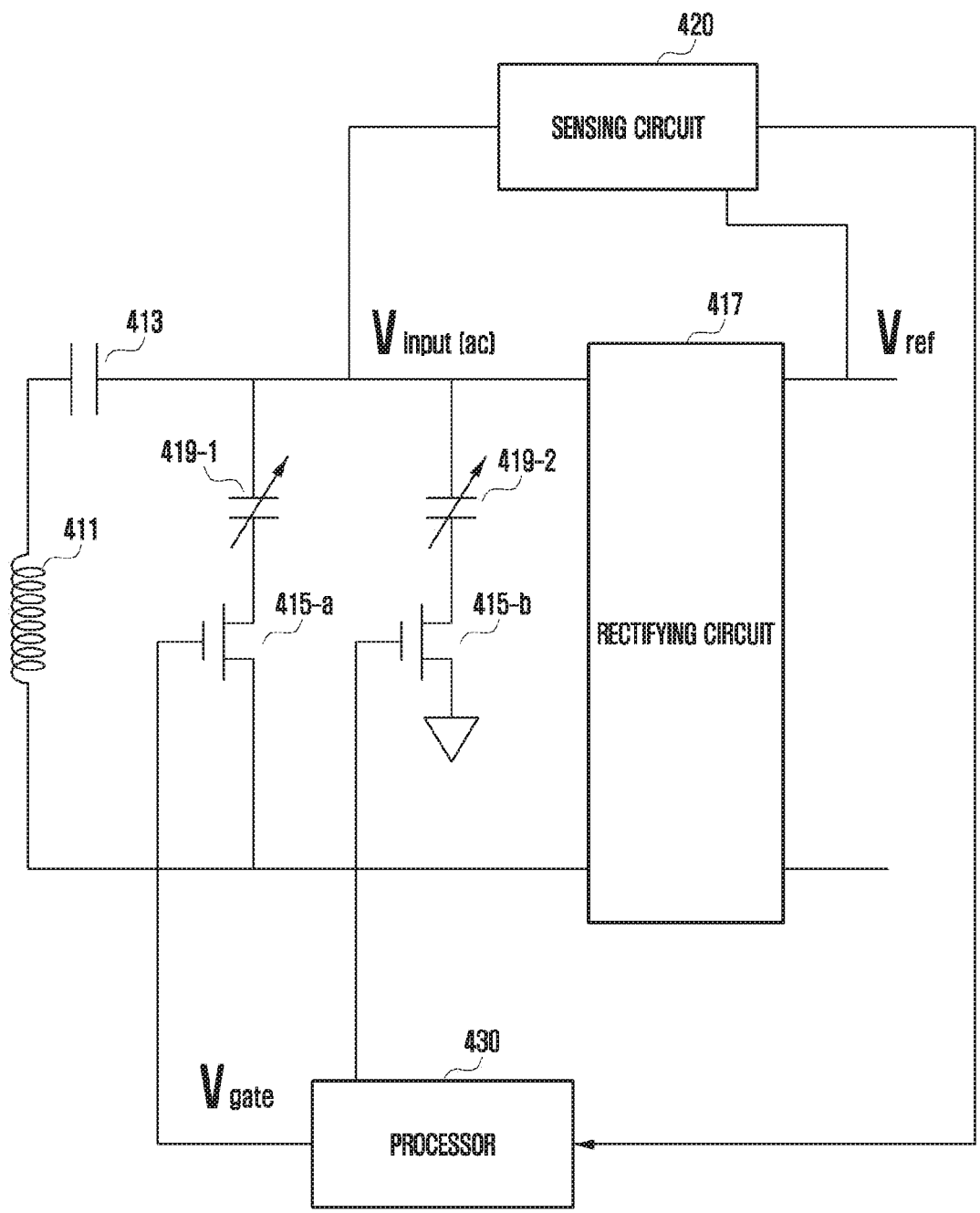

FIGS. 7A to 7C illustrate arrangement of a plurality of FET elements in an electronic device according to various embodiments of the disclosure.

According to various embodiments of the disclosure, a plurality of FET elements 415-1, 415-2, ..., 415-$n$ may be provided. For example, the multiple FET elements 415 may be connected in parallel to operate as a resistor having various values.

Referring to FIG. 7A, the FET elements 415-1, 415-2 ... 415-$n$ may be connected in parallel with each other. Gate terminals of the FET elements 415-1, 415-2 ... 415-$n$ are electrically connected to a processor (e.g., the processor 430 of FIG. 4), and the processor 430 may control the gate voltages of the FET elements 415-1, 415-2 ... 415-$n$. For example, the processor 430 may control the gate voltage of at least one among the plurality of FET elements 415-1, 415-2 ... 415-$n$ in order to perform load modulation. The plurality of FET elements 415-1, 415-2, ... 415-$n$ may be interpreted as resistors connected in parallel, and the processor 430 may perform various load modulations by performing control such that at least some FET elements among the plurality of FET elements 415-1, 415-2 ... 415-$n$ operate in the blocking region and by performing control such that at least some other FET elements among the plurality of FET elements 415-1, 415-2 ... 415-n operate in the linear region.

Referring to FIG. 7A, capacitors 419-a, 419-b ... 419-n may be connected in series to the drain terminals of the FET elements 415-1, 415-2 ... 415-n, respectively. The processor 430 may perform load modulation by controlling the capacitances of the variable capacitors. According to various embodiments, the capacitors 419-a, 419-b ... 419-n may be variable capacitors. The processor 430 may perform load modulation by controlling the capacitances of the variable capacitors.

Referring to FIG. 7B, one capacitor 710 may be connected to a portion where drain terminals of the plurality of FET elements 415-1, 415-2 ... 415-n are commonly connected. The capacitor 710 may be a variable capacitor. The processor 430 may perform load modulation by controlling the capacitance of the variable capacitor.

According to various embodiments of the disclosure, source terminals of the plurality of FET elements 415-1, 415-2 ... 415-n may be grounded or connected to the input terminal of the rectifying circuit 417. Referring to FIG. 7C, a source terminal of the FET element 415-a, among the plurality of FET elements, may be connected to the input terminal of the rectifying circuit, and a source terminal of another FET element 415-b may be grounded.

An electronic device according to various embodiments of the disclosure may include: a wireless power-receiving circuit including a wireless coil for receiving power from an external electronic device and a rectifying circuit for converting an electrical signal received from the external electronic device into a direct-current signal; a sensing circuit for determining the state of the electronic device by identifying a signal applied to the wireless power-receiving circuit by means of the external electronic device; and a processor. The processor is configured to: receive an output signal of the sensing circuit; and control a gate voltage of at least one field effect transistor (FET) element connected to an input terminal of the rectifying circuit, based on the output signal.

In the electronic device according to various embodiments of the disclosure, the processor may be configured to: identify the magnitude of a signal input to the rectifying circuit or a signal output from the rectifying circuit, based on the output signal; and control, in the case in which the magnitude of the signal is out of a configured range, the gate voltage such that the magnitude of the signal falls within the configured range.

In the electronic device according to various embodiments of the disclosure, the processor may be configured to: identify the magnitude of a modulated signal output from a modulation circuit including the at least one FET element, based on the output signal; and control, in the case in which the magnitude of the modulated signal is out of a configured range, the gate voltage such that the magnitude of the modulated signal falls within the configured range.

In the electronic device according to various embodiments of the disclosure, the processor may identify the magnitude of a voltage output from the rectifier, based on the output signal, and may, in the case in which a magnitude of the amount of a change in the voltage is equal to or greater than a configured value, control the gate voltage in order to reduce the amount of the change in the voltage.

In the electronic device according to various embodiments of the disclosure, the processor may be configured to control the gate voltage in order to adjust the resistance of a variable resistor implemented by the FET element.

In the electronic device according to various embodiments of the disclosure, the electronic device may further include a plurality of FET elements connected to an input terminal of the rectifying circuit, and the plurality of FET elements may be connected in parallel.

In the electronic device according to various embodiments of the disclosure, the processor may be configured to control a voltage input to a gate of each of the plurality of FET elements, based on the output signal.

In the electronic device according to various embodiments of the disclosure, the FET element may have one of a source terminal or a drain terminal thereof connected to an input terminal of the rectifying circuit, and may have a remaining one thereof connected to another input terminal of the rectifying circuit.

In the electronic device according to various embodiments of the disclosure, the FET element may have one of a source terminal or a drain terminal thereof connected to an input terminal of the rectifying circuit, and may have a remaining one thereof grounded.

An electronic device according to various embodiments of the disclosure may further include at least one capacitor commonly connected to either of the source terminals or the drain terminals of the plurality of FET elements.

In the electronic device according to various embodiments of the disclosure, the capacitance of the at least one capacitor may be changed, and the processor may be configured to change the capacitance, based on the output signal.

In the electronic device according to various embodiments of the disclosure, the FET element may have one of a source terminal or a drain terminal thereof connected to an input terminal of the rectifying circuit, and may have a remaining one thereof grounded.

An electronic device according to various embodiments of the disclosure may further include at least one capacitor commonly connected to either of the source terminals and the drain terminals of the plurality of FET elements.

In the electronic device according to various embodiments of the disclosure, the capacitance of the at least one capacitor may be changed, and the processor may be configured to change the capacitance, based on the output signal.

According to various embodiments of the disclosure, the electronic device may further include a memory storing at least one of a table containing a magnitude of the gate voltage mapped to a magnitude of the signal, a table containing a magnitude of the gate voltage mapped to a magnitude of a voltage output from the rectifying circuit, and a table containing a magnitude of the gate voltage mapped to a magnitude of a voltage input to the rectifying circuit. In the case in which at least one of the magnitude of the signal, the magnitude of the voltage output from the rectifying circuit, and the magnitude of the voltage input to the rectifying circuit is equal to or greater than a configured value, the processor is configured to identify the magnitude of the gate voltage corresponding to the magnitude of the signal using the table and control the gate voltage to the identified magnitude.

In the electronic device according to various embodiments of the disclosure, a source terminal of at least one FET element among the plurality of FET elements may be grounded, and a source terminal of at least another FET element thereof may be connected to an input terminal of the rectifying circuit.

Figure 8:
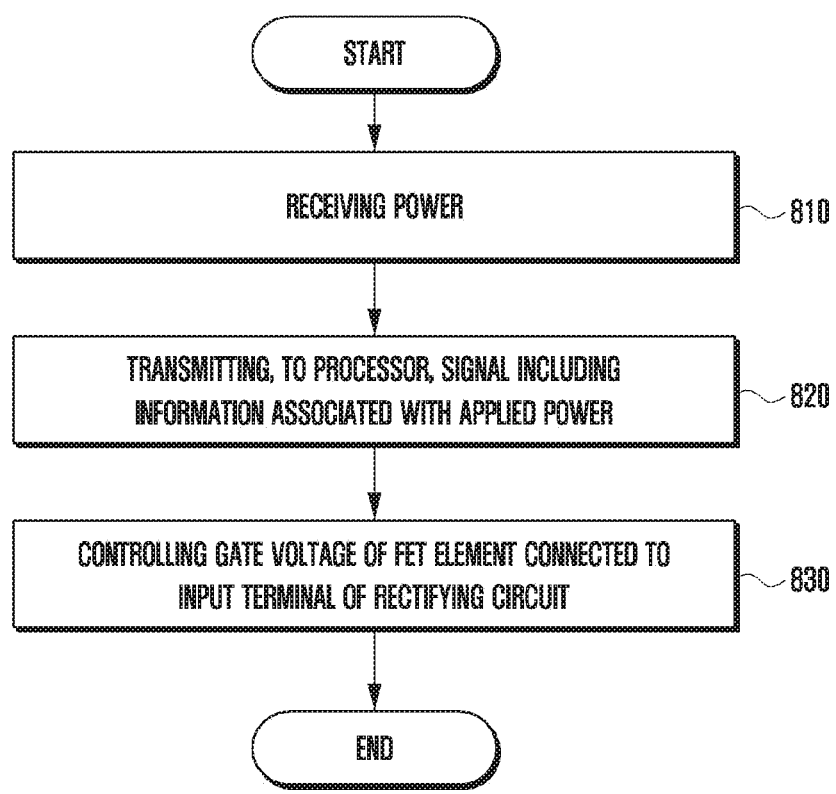
FIG. 8 is a flowchart showing a method for operating an electronic device according to various embodiments of the disclosure.

FIG. 8 is a flowchart showing a method for operating an electronic device according to various embodiments of the disclosure.

Referring to FIG. 8, the electronic device (e.g., the electronic device 100 of FIG. 1) may receive power in operation 810. According to various embodiments of the disclosure, the electronic device 100 may receive power, which is wirelessly transmitted by an external electronic device (e.g., the power supply device 10 of FIG. 3), using various methods, including an electromagnetic induction method and the like. In order to receive power wirelessly transmitted by the external electronic device 10, the electronic device 100 may include the coil 411, the capacitor 413, and the power-receiving circuit (e.g., the power-receiving circuit 410 of FIG. 4) including the rectifying circuit 417, which converts a power signal into a DC signal.

The power-receiving circuit 410 may receive power, which is transmitted by the external electronic device 10 using various methods.

In operation 820, the sensing circuit (e.g., the sensing circuit 420 of FIG. 4) may transmit, to the processor (e.g., the processor 430 of FIG. 4), a signal including information associated with the power transmitted by the external electronic device 10. The sensing circuit 420 may be electrically connected to an input terminal of the rectifying circuit 417 and an output terminal of the rectifying circuit 417. The sensing circuit 420 may identify a rectified signal output from the output terminal of the rectifying circuit 417, and may identify various information, such as the magnitude of a signal input to the input terminal of the rectifying circuit 417 and the magnitude of the rectified signal. The output signal of the sensing circuit 417 including the identified information may be transmitted to the processor 430. The magnitude of the signal input to the input terminal of the rectifying circuit 417 may be the strength (a magnitude, and a change amount) of a signal including at least a signal component generated based on the operation of the modulation circuit 440. The load-modulated signal may include a rectified voltage, current, and other digital information of the power-receiving device.

In operation 830, the processor 430 may control a gate voltage of at least one FET element (e.g., the FET element 415 of FIG. 4) connected to an input of the rectifying circuit 417, based on an output signal output from the sensing circuit 417. To this end, the gate terminal of the FET element 415 may be connected to the processor 430. By controlling the gate voltage of the FET element 415, a resistance value of the FET element 415, which operates as a resistor in the linear region, may be adjusted. The processor 430 may perform load modulation by adjusting the magnitude of the resistance of the FET element 415. A plurality of FET elements 415 may be provided. In the case in which a plurality of FET elements are provided, the plurality of FET elements may be connected in parallel and implemented as resistors connected in parallel.

Figure 9:
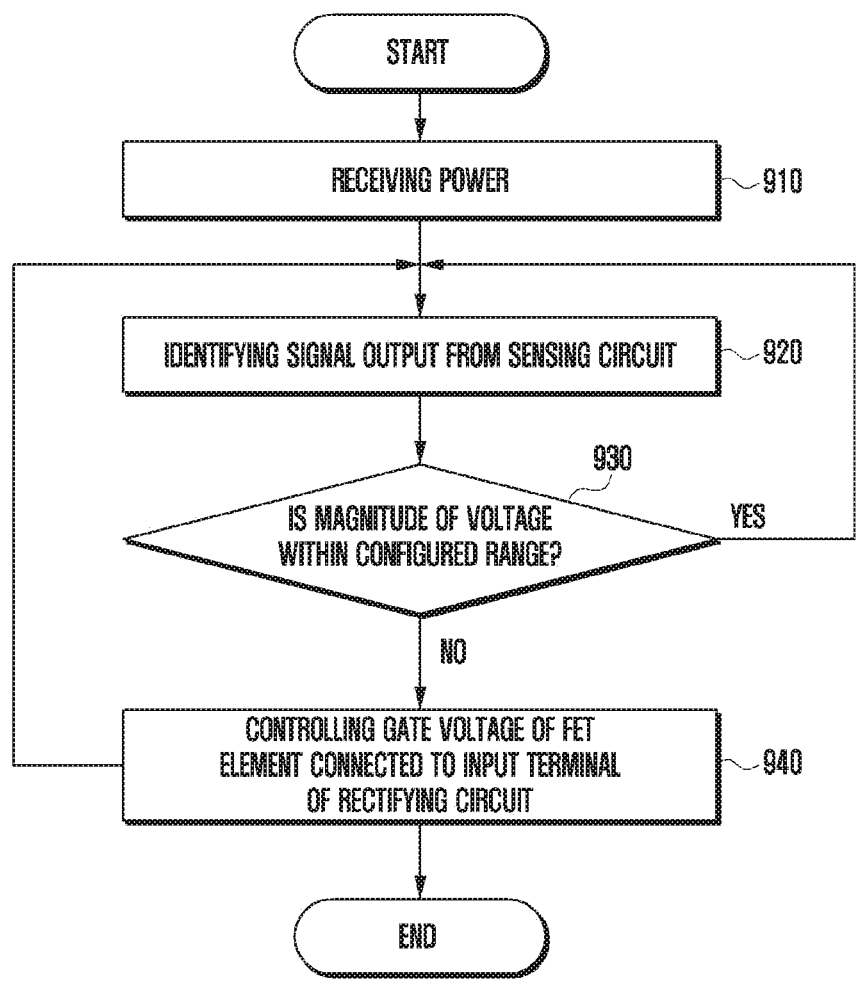
FIG. 9 is a flowchart showing a method for operating an electronic device according to another embodiment of the disclosure.

FIG. 9 is a flowchart illustrating a method for operating an electronic device according to another embodiment of the disclosure.

Referring to FIG. 9, the electronic device (e.g., the electronic device 100 of FIG. 1) may receive power in operation 910. According to various embodiments of the disclosure, the electronic device 100 may receive power, which is wirelessly transmitted by an external electronic device (e.g., the power supply device 10 of FIG. 3), using various methods including an electromagnetic induction method and the like. In order to receive power wirelessly transmitted by the external electronic device 10, the electronic device 100 may include the coil 411, the capacitor 413, and the power-receiving circuit (e.g., the power-receiving circuit 410 of FIG. 4) including the rectifying circuit 417, which converts a power signal into a DC signal. The power-receiving circuit 410 may receive power transmitted by the external electronic device 10 using various methods.

The processor (e.g., the processor 430 of FIG. 4) may identify a signal output from the sensing circuit (e.g., the sensing circuit 420 of FIG. 4) in operation 920.

According to various embodiments of the disclosure, the sensing circuit 420 may identify a signal output from the rectifying circuit 417 and may identify the magnitude of the voltage of the output signal.

According to various embodiments of the disclosure, the sensing circuit 420 may identify at least one of a signal input to the rectifying circuit 417 and a modulated signal output from the modulation circuit 440. The sensing circuit 420 may transmit a signal including the identified various information to the processor 430.

The processor 430 may determine whether the magnitude of the voltage (or current) of the signal output from the sensing circuit 420 is within a configured range in operation 930. Alternatively, the processor 430 may determine whether the magnitude of the voltage of the signal input to the sensing circuit 420 is within a configured range.

In operation 940, the processor 430 may control a gate voltage applied to a gate terminal of an FET element (e.g., FET element 415 of FIG. 4) connected to an input terminal of the rectifying circuit 417 in response to confirming that the magnitude of the voltage is out of the configured range.

According to various embodiments of the disclosure, by controlling the magnitude of the voltage applied to the gate terminal of the FET element 415, the magnitude of the resistance of the FET element 415 can be adjusted so that load modulation may be performed and the magnitude of the load-modulated signal may be adjusted. After controlling the gate voltage of the FET element 415, the processor 430 may again return to operation 920, and then may identify a signal output from the sensing circuit 420 and determine whether the magnitude of the voltage is equal to or greater than (or greater than) the configured value. In the case in which the magnitude of the voltage is equal to or greater than (or greater than) the configured value, operation 940 may be repeated.

In operation 950, the processor 430 may perform battery charging using the rectified signal in response to confirming that the magnitude of the voltage is smaller than or equal to (or smaller than) the configured value.

A method for operating an electronic device according to various embodiments of the disclosure may include: identifying a signal output from a sensing circuit that senses a signal applied to a wireless power-receiving circuit by an external electronic device; and controlling a gate voltage applied to a gate of at least one field effect transistor (FET) element connected to an input terminal of a rectifying circuit that converts the applied signal into a DC signal.

In the method for operating an electronic device according to various embodiments of the disclosure, the identifying of the signal output from the sensing circuit may include identifying the magnitude of the voltage output from the rectifying circuit, based on the output signal. The controlling of the gate voltage may include controlling the gate voltage such that the magnitude of the voltage becomes smaller than the configured value in the case in which the magnitude of the voltage is equal to or greater than the configured value.

In the method for operating an electronic device according to various embodiments of the disclosure, the identifying of the signal output from the sensing circuit may include identifying the magnitude of a voltage of a signal input to the rectifying circuit or a signal output from the rectifying circuit, based on the output signal. The controlling of the gate voltage may include controlling the gate voltage to reduce the magnitude of the voltage in the case in which the magnitude of the voltage is equal to or greater than the configured value.

According to various embodiments of the disclosure, the method for operating an electronic device may include: identifying the magnitude of an electrical signal input to the rectifying circuit or an electrical signal output from the rectifying circuit; identifying a table containing a magnitude of the gate voltage mapped to a magnitude of the signal in the case in which a magnitude of the voltage is equal to or greater than a configured value; identifying a magnitude of the gate voltage corresponding to the magnitude of the signal using the table; and controlling the gate voltage to the identified magnitude.

In the method for operating an electronic device according to various embodiments of the disclosure, the controlling of the gate voltage may include controlling the gate voltage in order to adjust the resistance of a variable resistor implemented by the FET element.

According to various embodiments of the disclosure, the method for operating an electronic device may further include changing the capacitance of at least one variable capacitor connected in series with the FET element, based on the output signal.

According to various embodiments of the disclosure, the method for operating an electronic device may include: identifying the magnitude of a voltage input to or output from the rectifying circuit; identifying a table containing the magnitude of the gate voltage mapped to the magnitude of the voltage in the case in which the magnitude of the voltage is equal to or greater than a configured value; identifying the magnitude of the gate voltage corresponding to the magnitude of the voltage using the table; and controlling the gate voltage to the identified magnitude.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device configured to wirelessly receive power, the device comprising:
   a wireless power-receiving circuit comprising a wireless coil for receiving power from an external electronic device and a rectifying circuit for converting an electrical signal received from the external electronic device into a direct-current signal;
   a modulation circuit connected to an input terminal of the rectifying circuit and comprising at least one field effect transistor (FET) element, wherein the at least one FET element operates as a variable resistor;
   a sensing circuit for determining a state of the electronic device;
   a processor; and
   a memory storing a table containing at least one of a magnitude of a gate voltage mapped to a magnitude of a signal, a magnitude of the gate voltage mapped to a magnitude of a voltage output from the rectifying circuit, and a magnitude of the gate voltage mapped to a magnitude of a voltage input to the rectifying circuit,
   wherein the processor is configured to:
      receive an output signal of the sensing circuit;
      determine whether a magnitude of a modulated signal output from the modulation circuit is in a predetermined range based on the output signal;
      adjust the resistance of the variable resistor by controlling the gate voltage of the at least one FET element based on the determination that the magnitude of the modulated signal is not in the predetermined range;
      identify a magnitude of a signal input to the rectifying circuit or a signal output from the rectifying circuit, based on the output signal; and
      control, in a case in which the magnitude of the signal is out of a configured range, the gate voltage such that the magnitude of the signal falls within the configured range, and
   wherein, in a case in which at least one of a magnitude of the signal, a magnitude of a voltage output from the rectifying circuit, and a magnitude of a voltage input to the rectifying circuit is equal to or greater than a configured value, the processor is configured to:
      identify a magnitude of the gate voltage corresponding to a magnitude of the signal using the table; and
      control the gate voltage to the identified magnitude.

2. The device of claim 1, wherein the processor is configured to:
   identify a magnitude of a voltage output from the rectifying circuit, based on the output signal; and
   control, in the case in which a magnitude of an amount of a change in the voltage is equal to or greater than a configured value, the gate voltage in order to reduce the amount of the change in the voltage.

3. The device of claim 1, further comprising a plurality of FET elements connected to an input terminal of the rectifying circuit,
   wherein the plurality of FET elements are connected in parallel.

4. The device of claim 3, wherein the processor is configured to control a voltage input to a gate of each of the plurality of FET elements, based on the output signal.

5. The device of claim 1, wherein the FET element has one of a source terminal or a drain terminal thereof connected to an input terminal of the rectifying circuit and has a remaining one thereof connected to another input terminal of the rectifying circuit.

6. The device of claim 1, wherein the FET element has one of the source terminal or the drain terminal thereof connected to an input terminal of the rectifying circuit and has a remaining one thereof grounded.

7. The device of claim 3, further comprising at least one capacitor commonly connected to either of the source terminals or the drain terminals of the plurality of FET elements.

8. The device of claim 7, wherein a capacitance of the at least one capacitor can be changed, and the processor is configured to change the capacitance, based on the output signal.

9. The device of claim 3, wherein a source terminal of at least one FET element among the plurality of FET elements is grounded, and a source terminal of at least another FET element thereof is connected to an input terminal of the rectifying circuit.

10. A method for controlling an electronic device configured to wirelessly receive power, the method comprising:
    identifying a signal output from a sensing circuit that senses a signal applied to a wireless power-receiving circuit by an external electronic device;
    determining whether a magnitude of a modulated signal output from a modulation circuit is in a predetermined range based on the output signal, the modulation circuit comprising at least one field effect transistor (FET) element connected to an input terminal of a rectifying circuit that converts the applied signal into a DC signal, the at least one FET element operating as a variable resistor;
    adjusting the resistance of the variable resistor by controlling a gate voltage applied to a gate of the at least one FET element based on the determination that the magnitude of a modulated signal is not in the predetermined range;
    identifying a magnitude of a signal input to the rectifying circuit or a signal output from the rectifying circuit, based on the output signal;
    controlling, in a case in which the magnitude of the signal is out of a configured range, the gate voltage such that the magnitude of the signal falls within the configured range;
    wherein, in a case in which at least one of a magnitude of the signal, a magnitude of a voltage output from the rectifying circuit, and a magnitude of a voltage input to the rectifying circuit is equal to or greater than a configured value, identifying a magnitude of the gate voltage corresponding to a magnitude of the signal using a table stored in a memory of the electronic device, and
    controlling the gate voltage to the identified magnitude,
    wherein the table contains at least one of a magnitude of a gate voltage mapped to a magnitude of a signal, a magnitude of the gate voltage mapped to a magnitude of a voltage output from the rectifying circuit, and a magnitude of the gate voltage mapped to a magnitude of a voltage input to the rectifying circuit.

11. The method of claim 10, wherein identifying the signal output from the sensing circuit comprises identifying a magnitude of a voltage output from the rectifying circuit, based on the output signal, and
    wherein the controlling of the gate voltage comprises controlling the gate voltage such that the magnitude of the voltage becomes smaller than a configured value in a case in which the magnitude of the voltage is equal to or greater than the configured value.

\* \* \* \* \*